(12) United States Patent
Leboudec

(10) Patent No.: US 12,019,084 B2
(45) Date of Patent: Jun. 25, 2024

(54) LABORATORY AUTOMATION DEVICE CONTROL PROGRAM GENERATION WITH OBJECT DETECTION

(71) Applicant: TECAN TRADING AG, Maennedorf (CH)

(72) Inventor: Ronan Leboudec, Zürich (CH)

(73) Assignee: TECAN TRADING AG, Maennedorf (CH)

( * ) Notice: Subject to any disclaimer, the term of this patent is extended or adjusted under 35 U.S.C. 154(b) by 1017 days.

(21) Appl. No.: 16/926,900

(22) Filed: Jul. 13, 2020

(65) Prior Publication Data
US 2021/0025906 A1  Jan. 28, 2021

(30) Foreign Application Priority Data

Jul. 25, 2019  (EP) .................................. 19 188 359

(51) Int. Cl.
*G01N 35/00* (2006.01)
*G01N 35/10* (2006.01)
(Continued)

(52) U.S. Cl.
CPC ... *G01N 35/00732* (2013.01); *G01N 35/0099* (2013.01); *G01N 35/1011* (2013.01);
(Continued)

(58) Field of Classification Search
CPC ......... G01N 35/00732; G01N 35/0099; G01N 35/1011; G01N 35/1016;
(Continued)

(56) References Cited

U.S. PATENT DOCUMENTS

| 2006/0085162 A1 | 4/2006 | Bjornson et al. |
| 2018/0056286 A1 | 3/2018 | Zucchelli et al. |
| 2019/0302135 A1* | 10/2019 | Yoshida ............. G01N 35/1002 |

FOREIGN PATENT DOCUMENTS

| DE | 19956178 C2 | 5/2001 |
| EP | 2269077 B1 | 4/2013 |

(Continued)

OTHER PUBLICATIONS

Sotokawa, Takayuki (JP Examiner), Notice of Reasons for Refusal issued Feb. 6, 2024 in corresponding Japanese Application No. 2020-115832 (in Japanese and English), 6 pages.

*Primary Examiner* — Basil T. Jos
(74) *Attorney, Agent, or Firm* — MH2 TECHNOLOGY LAW GROUP LLP

(57) ABSTRACT

A method for generating a control program for a laboratory automation device includes: receiving video data displaying a work area of a laboratory assistant, the work area containing a hand-held pipette and containers for receiving a liquid; detecting openings of the containers in the video data and determining positions of the openings; detecting a pipette tip of the hand-held pipette in the video data and determining a movement of the tip; and generating the control program for the laboratory automation device from the movement of the pipette tip with respect to the positions of the openings, wherein the control program is adapted for moving a pipetting arm with a robot pipette of the laboratory automation device with respect to containers of the laboratory automation device accordingly to the movement of the hand-held pipette in the work area.

14 Claims, 2 Drawing Sheets

(51) Int. Cl.
*G05B 19/042* (2006.01)
*G06V 20/10* (2022.01)
*G06V 20/40* (2022.01)

(52) U.S. Cl.
CPC ..... *G01N 35/1016* (2013.01); *G05B 19/0426* (2013.01); *G06V 20/10* (2022.01); *G06V 20/40* (2022.01); *G01N 2035/00742* (2013.01); *G05B 2219/23008* (2013.01)

(58) Field of Classification Search
CPC ... G01N 2035/00742; G01N 35/00584; G05B 19/0426; G05B 2219/23008; G05B 19/423; G05B 2219/36453; G06V 20/10; G06V 20/40; B01L 3/021; B01L 2300/021; B01L 2300/023; B25J 9/1697; G01B 11/00; G01B 11/22; G06K 17/0029
See application file for complete search history.

(56) References Cited

FOREIGN PATENT DOCUMENTS

| | | | |
|---|---|---|---|
| EP | 2653272 | A1 | 10/2013 |
| JP | 2013543984 | A | 12/2013 |
| WO | 2012069925 | A1 | 5/2012 |

\* cited by examiner

LABORATORY AUTOMATION DEVICE CONTROL PROGRAM GENERATION WITH OBJECT DETECTION

CROSS-REFERENCE TO RELATED APPLICATION(S)

This application claims the benefit of and priority to European Patent Application No. 19 188 359.4, filed Jul. 25, 2019, the entire contents of which are incorporated herein by reference.

FIELD OF THE INVENTION

The invention relates to a method, a computer program and a computer-readable medium for generating a control program for a laboratory automation device as well as to a control system.

BACKGROUND OF THE INVENTION

Laboratory automation devices are used for automating tasks of a laboratory assistant, which, for example, tests a patient for specific diseases. Usually, a sample of the patient's blood, urine, stool, etc. is taken and analyzed by means of a bio-chemical procedure. Such a procedure consists in various operations like adding substances, incubating, separating, etc. and a measurement process which quantitatively or qualitatively measures the amount or presence of a substance indicating the specific disease.

Usually, the programming of a laboratory automation device is a complicated task that needs special skills. A program for controlling the laboratory automation device may have to be input into a controlling PC. Although graphical tools for generating such a program may exist, more complicated procedures may have to be implemented with a specific scripting language, which needs special knowledge in programming and in the functioning of the laboratory automation device. Therefore, laboratory assistants tend to perform procedures with a small number of samples themselves.

To simplify the programming of a laboratory automation device with a robot arm, it is known to manually move the robot arm in a teach mode, in which the robot arm can be freely moved to any location and teachpoints can be set by simply pressing a button. The position of the robot arm at the teachpoints is then saved and these positions are used for generating a control program.

EP 2 269 077 B1 relates to a graphical programming method, in which parts of the layout of a laboratory automation device are shown in a graphical interface. A pipette in the graphical interface can be moved for defining a control program of the laboratory automation device.

US 2006/0 085 162 A1 describes a method of transferring an assay protocol developed with an operator carried, hand-held sample transfer tool to a robotic sample processor. A position retrieval based on electromagnetic triangulation is used for detecting an actual position of an active tool piece.

DESCRIPTION OF THE INVENTION

It is an objective of the invention to simplify the programming and/or control of a laboratory automation device.

This objective is achieved by the subject-matter of the independent claims. Further exemplary embodiments are evident from the dependent claims and the following description.

A first aspect of the invention relates to a method for generating a control program for a laboratory automation device. The method may be performed with a system that comprises the laboratory automation device, its controller and a camera.

In general, a laboratory automation device may be any device adapted for automatically performing tasks of a laboratory assistant. At least such a laboratory automation device comprises a pipetting arm, which is adapted for moving a robot pipette between different positions and for aspirating and ejecting of liquid at these positions. The liquid may be aspirated from and ejected in cavities provided by containers, which may be positioned on a worktable of the laboratory automation device. Such containers may comprise at least one of a well, a sample tube, a microtiter plate and/or a reagent container, etc.

With the method, the movements and/or operations of a laboratory assistant are recorded by a camera and the video data generated by the camera are evaluated, for example with object recognition and objected tracking, to determine the steps of a control program for the laboratory automation device.

According to an embodiment of the invention, the method comprises: receiving video data displaying a work area of a laboratory assistant, the work area containing a hand-held pipette and containers for extracting and/or receiving a liquid. The laboratory assistant may perform an assay protocol with the hand-held pipette and the containers, which may comprise samples, liquids and/or reagents. For example, the containers may comprise at least one of a well, a microtiter plate, a reagent container, a sample tube, etc. It may be that the work area has been assembled by the laboratory assistant with a set of containers, which, for example, may have been positioned on a table. However, the work area also may be a part of the laboratory automation device, such as the worktable of the laboratory automation device and containers positioned thereon. In this case, the pipetting arm may be moved in a position, where it does not disturb the movements of the hand-held pipette.

The work area and the movements of the laboratory assistant may be recorded by a camera, which field of view is oriented to the containers and/or the hand-held pipette. The camera may operate with visible, ultraviolet and/or infrared light.

The video data, which also may be seen as a video stream and/or or a series of images over time, may comprise grayscale or color pixel data, which optionally also may comprise depth information. For example, every pixel may be provided with a depth value, which may be generated by a TOF—(time of flight)—camera. However, it also is possible that the depth information is provided in the form of stereo data, i.e. two sets of video data acquired by two cameras.

According to an embodiment of the invention, the method further comprises: detecting openings of the containers in the video data and determining positions of the openings; and detecting a pipette tip of the hand-held pipette in the video data and determining a movement of the tip. For example, the openings may be detected based on their shape, for example, the openings may be darker circles with respect to their environment in the video data and such circles may be detected with an object recognition algorithm. The pipette tip also may be detected in this way, i.e. based on its shape. It also may be possible that the pipette tip is marked with a special color and/or pattern, which may be used for detecting the position of the pipette tip in the video data.

The containers may be deposited on a workbench as work area. It also may be that the containers are held by the laboratory assistant in one of his hands.

From the positions of the openings and the pipette tip in the video data, a three-dimensional position of the openings and/or the pipette tip may be derived. This may be facilitated, when the video data contains depth information. Depending on the shape and/or optical marks, type and/or content of a container may be identified.

The movement of the pipette tip may be encoded with points along a track, the tip is following. In general, the movement of the pipette tip may be encoded with movement data containing information about positions of the pipette tip over time.

According to an embodiment of the invention, the method further comprises: generating a control program for the laboratory automation device from the movement of the pipette tip with respect to the openings, wherein the control program is adapted for moving a pipetting arm with a robot pipette of the laboratory automation device with respect to containers of the laboratory automation device accordingly to the movement of the hand-held pipette in the work area.

In summary, different pipetting actions as well as labware movements may be performed by the laboratory assistant. All relevant aspects of the manual execution may be used to generate the control program, which may include information on pipetting speed, position and timing between the actions performed by the laboratory assistant.

It may be that the control program is generated and/or executed, during the time, when the hand-held pipette is moved by the laboratory assistant. In other words, the control program may be generated and/or executed (nearly) simultaneously with the movement of the hand-held pipette. It also may be that the control program is generated and/or executed, when the laboratory assistant has finished the movement of the hand-held pipette. It also may be that the control program is generated and stored, when the laboratory assistant has finished the movement of the hand-held pipette and the control program is executed at a later time.

For example, specific tracking or teaching points on the track of the hand-held pipette may be determined from the video data. Such points may be defined and/or recorded, when the pipette tip of the hand-held pipette enters an opening as detected in the video data. From these points, a movement of the pipetting arm may be derived, which movement also visits all these openings of the containers of the laboratory automation device corresponding to the containers of the work area. It has to be noted that the track of the robot pipette may be different from the track of the hand-held pipette. This may be due to the fact that the containers in the laboratory automation device are arranged in a different way and/or that the track is adapted to a more efficient movement of the pipetting arm.

Besides a one channel hand-held pipette, also a multi-channel hand-held pipette may be used. In this case, the multiple pipette tips may be tracked.

The movement of the pipetting arm may be encoded into a control program, which, when executed, performs the movement. The control program may be any data or data file, which, when processed by a controller of the laboratory automation device, results in the respective movement of the pipetting arm.

The control program also may be a script program that may be modified by the laboratory assistant. For example, as described below, the types of containers and/or liquids used during the assay protocol may be encoded with colors, which are indicated in the script program. The respective colors in the script program then may be replaced with reagent types and/or container types in the script program by the laboratory assistant.

According to an embodiment of the invention, the openings and the pipette tip are detected with an object recognition algorithm. It also may be that other components of the laboratory automation device, such as the containers, are detected with an object recognition algorithm. It may be that a shape of an object, such as of the openings, the pipette tip and/or the containers, is stored in the computing device processing the video data and that this shape is compared with shapes extracted from the video data. When the shapes are in concordance, the respective object may be detected and its position in the video data may be determined. From the position in the video data, a position of the respective object with respect to the work area may be determined.

According to an embodiment of the invention, the movement of the pipette tip is tracked with an object tracking algorithm. In this way, a track of the pipette tip with respect to the containers and/or their openings may be determined.

When the camera is stationary, it may be assumed that also the containers and its openings stay stationary. However, when the camera is moving, for example in the case when the camera is attached to the head of the laboratory assistant, also the positions of the containers and/or the openings may be tracked in the video data. Therefrom, a relative position of the pipette tip with respect to the containers may be determined. It also may be that one or more containers are moved by the laboratory assistant. In this case, also the one or more containers and/or their openings(s) may be tracked.

According to an embodiment of the invention, the method further comprises: identifying a type of container for each container or at least some of the containers from the video data. By identifying the container, a type of liquid in the container may be determined. The control program then may be generated for containers of the laboratory automation device of the same type as identified for the containers in the work area. For example, it may be determined, which type of liquid is aspirated and/or dispensed by the laboratory assistant and the control program is generated to aspirate and dispense the same type of liquid.

The type of container may refer to the content of the container and/or to properties of the container, such as a volume, a shape, etc.

The type of liquid may refer to a chemical and/or physical property like viscosity, surface tension or specific density and/or content of the liquid, such as the liquid being a buffer solution, a sample, a reagent, etc.

According to an embodiment of the invention, the method further comprises: identifying a type of container for each container or at least some of the containers from a RFID tag attached to the container. It may be that some or all of the containers are provided with an RFID tag, also called RFID responder, from which a code can be read with an RFID reader. The RFID reader may be hold by the laboratory assistant, may be integrated into the laboratory automation device and/or the work area.

According to an embodiment of the invention, the containers in the work area are provided with a computer-readable code and the type of container is determined from the computer-readable code in the video data. Such a computer-readable code may be a bar code or two-dimensional code.

According to an embodiment of the invention, the containers in the work area are provided with a (possibly colored and/or patterned) label and the information encoded and/or presented by the label of a container is determined from the video data. In this case, the type of container may be determined from the information, such as a color and/or a specific pattern.

It may be that the openings are colored. For example, the border of an opening may be black, pink, red, etc.

It may be that the specially labeled containers are used in the work area, which do not need to contain the real reagents, samples, etc., but which are solely used for generating the control program. In this case, the labels may be made in such a way that also the laboratory assistant can interpret their information, such as color or a pattern.

It may be that the containers used in the work area do not need to contain any liquids but are solely used for generating the control program. In this case, the laboratory assistant will aspirate and dispense air in the hand-held pipette.

The control program may be a script program editable by the laboratory assistant, which in a first step contains the label information as placeholder, which then may be replaced with the intended instructions for the intended reagents.

According to an embodiment of the invention, the type of container is determined from a shape of the container, which is determined from the video data. The type of container in this case may be, whether it is a trough, a test tube, a microtiter plate (with, for example, the number and/or arrangement of cavities).

According to an embodiment of the invention, the method further comprises: receiving operational data from the hand-held pipette, the operational data comprising at least one of: activation of aspirating and/or dispensing of a liquid, a dispensed and/or aspirated amount of liquid, a speed of aspirating and/or dispensing. Specific hand-held pipettes may measure, whether they have been activated for aspirating and/or dispensing. Furthermore, specific hand-held pipettes may be adjusted to perform aspirating and/or dispensing with specific process parameters such as mentioned above. These pipettes also may send the measured data and/or adjusted parameters to further devices, for example via wireless communication connection such as Bluetooth©. The operational data may be used for detailing the control program and/or may be overtaken into the control program.

According to an embodiment of the invention, the control program is adapted for controlling the robot pipette for aspirating and dispensing of a liquid accordingly to the operational data. From the operational data received from the hand-held pipette, control parameters and/or control commands may be generated, which control the laboratory automation device accordingly to the operational data.

However, it also may be possible that operation data, such as aspirating and/or dispensing at a container, is directly determined from the video data. For example, it may be determined from the video data, when the hand-held pipette or its tip is moved in an opening and then it may be assumed that there a liquid is aspirated (for example, when the pipette is empty) or dispensed (for example, when the pipette already has been aspirated).

According to an embodiment of the invention, aspiration points and dispensing points for liquids are determined from the movement of the pipette tip with respect to the openings. The aspiration points and dispensing points also may be determined from operation data received from the hand-held pipette. A movement of the pipetting arm then may be determined from the aspiration points and dispensing points.

The points, where a liquid is dispensed or ejected, may be seen as the most important tracking points and/or teach-points for programming the laboratory automation device. It may be that the control program is generated solely from these points. The movement of the pipetting arm between two consecutive points, for example an aspiration point and a consecutive dispensing point, may be determined independently from the movement and/or its track of the hand-held pipette between these points. Thus, a movement of the pipetting arm may follow a different track as the hand-held pipette. It may be that the movement of the pipetting arm is more optimized with respect to track length and/or with respect to restrictions of the pipetting arm in view of possible movements and/or avoiding of collisions within the laboratory automation device.

According to an embodiment of the invention, movement of the pipette tip and/or operational data for the pipette is recorded for one sample. The control program then may be generated, such that it repeats the movement of the pipetting arm and/or aspiration and dispensing of the robot pipette for a plurality of samples in the laboratory automation device. It also may be that an assay procedure performed with a one-channel pipette is translated to a control program for a multi-channel pipette.

The laboratory assistant may perform an assay procedure in the work area for only one sample. The control program may then be generated, such that it repeats or optimizes the movement of the pipetting arm, aspiration and dispensing of the robot pipette for a plurality of real samples in the laboratory automation device. The control program may repeat the steps for every sample in the laboratory automation device, which presence may have been determined with a sensor.

It also may be that the control program may be altered by the laboratory assistant after its generation. For example, the laboratory assistant may include a control structure into the control program, which repeats the steps, which have been generated for only one sample.

It has to be noted, that a tracking point or teaching point, from which a part control program is generated, may be defined with respect to the container type entered by the hand-held pipette. Such a point not only may encode a coordinate position. For example, the tracking point or teaching point may encode "pipette in sample tube", "pipette in empty well", etc. In such a way, not only the movement of the hand-held pipette may be repeated with the laboratory automation device, but the steps of the tasks performed by the laboratory assistant in the work area for one sample may be applied to several samples in the laboratory automation device. In this case, not the exact movement of the hand-held pipette, but the movement scheme defined with the hand-held pipette may be repeated.

For example, the movement of the hand-held pipette may be repeated for all samples of a microtiter plate. In this case, the movement may be determined by adding offsets to the original movement, which offsets may depend on distances between wells in the microtiter plate.

It also may be that a movement of a hand-held single channel pipette is mapped to the movement of a multi-channel robot pipette.

According to an embodiment of the invention, the video data comprises depth information and is generated with a camera adapted for generating depth information. As already mentioned, depth information may facilitate the determination of the relative positions of the containers and/or their openings with respect to the pipette tip. Also object recognition and object tracking may be improved.

For example, the camera may be a stereo camera or a TOF (time of flight) camera.

According to an embodiment of the invention, the video data is generated with a camera attached to a head of the laboratory assistant. With such a camera, the area in which the laboratory assistant is working always may be in a viewing direction of the camera.

A further aspect of the invention relates to a computer program for generating a control program for a laboratory automation device, which, when being executed by a processor, is adapted to carry out the steps of the method as described in the above and in the following. The computer program may be executed in a computing device, such as a PC, communicatively interconnected with the laboratory automation device and the camera.

A further aspect of the invention relates to a computer-readable medium, in which such a computer program is stored. A computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. In general, the computer-readable medium may be a non-transitory or transitory medium.

A further aspect of the invention relates to a control system for a laboratory automation device, which comprises the laboratory automation device and a camera. The computing device may be communicatively interconnected with the laboratory automation device and the camera, for example via USB, Ethernet and/or a wireless connection. Furthermore, the computing device is adapted for performing the method as described in the above and in the following.

The computing device also may be adapted for controlling the laboratory automation device and/or also may perform the control program, which was generated with the aid of object detection and/or object tracking in video data.

It has to be understood that features of the method as described in the above and in the following may be features of the control system, the computer program and the computer-readable medium as described in the above and in the following and vice versa.

Furthermore, the method may be a method for controlling the laboratory automation device, which then also may perform the generated control program.

These and other aspects of the invention will be apparent from and elucidated with reference to the embodiments described hereinafter.

BRIEF DESCRIPTION OF THE DRAWINGS

Below, embodiments of the present invention are described in more detail with reference to the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
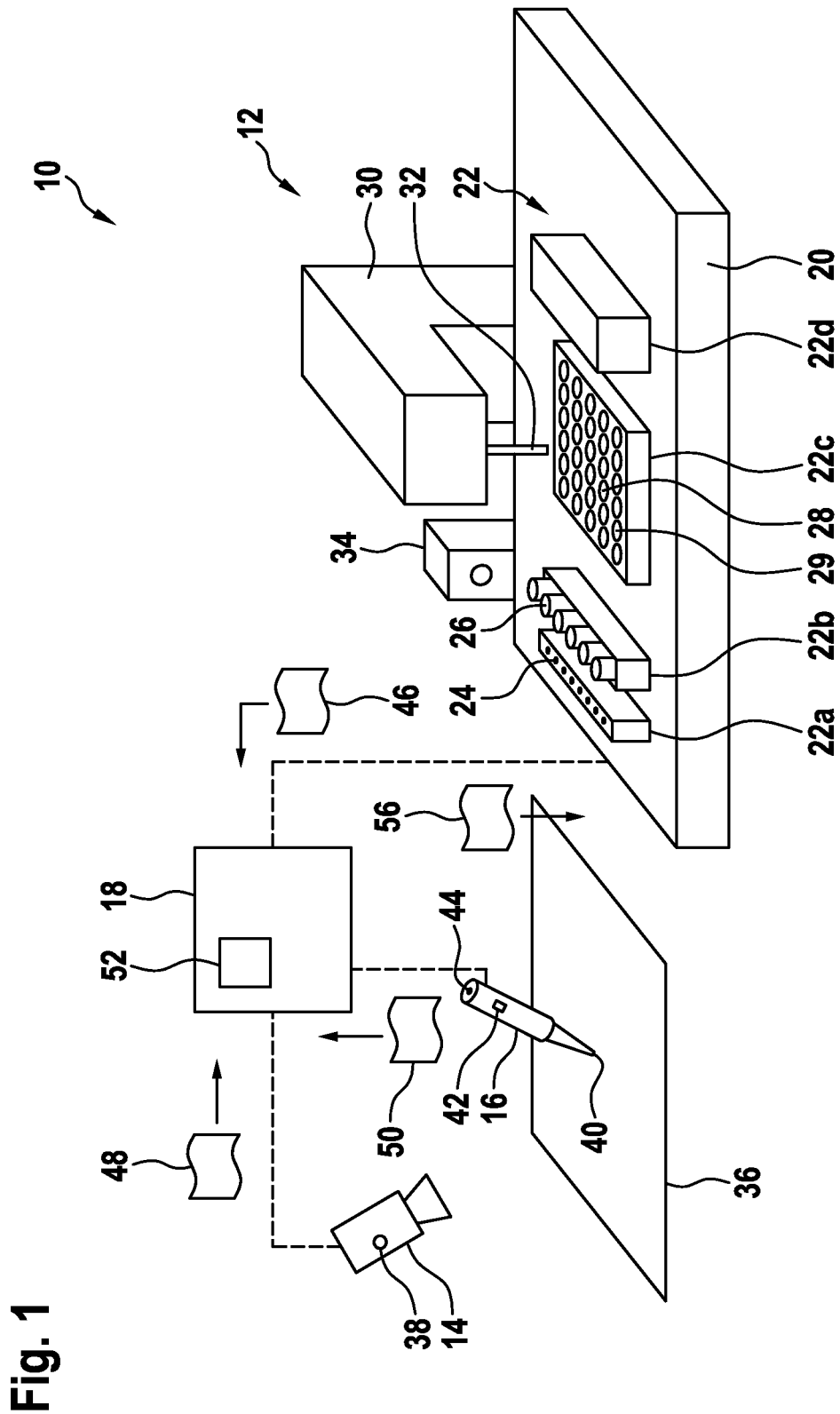
FIG. 1 schematically shows a control system according to an embodiment of the invention.

FIG. 1 shows a control system 10, which comprises a laboratory automation device 12, a camera 14 and a hand-held pipette 16. The control system 10 furthermore comprises a computing device 18, for example a PC, communicatively interconnected with the laboratory automation device 12, the camera 14 and the hand-held pipette 16. The communication may be performed via Bluetooth® and/or Ethernet®.

The laboratory automation device 12 comprises a workbench 20, onto which several removable containers 22 may be mounted. For example, the containers 22 comprise a container 22a with disposable pipette tips 24, a container 22b with sample tubes 26, a microtiter plate 22c with wells 28 and a reagent container 22d.

The laboratory automation device 12 furthermore comprises a pipetting arm 30 with a pipette 32 and a sensor 34 adapted for determining the position and/or orientations of the containers 22. The sensor 34 also may be and/or comprise a reader adapted for reading barcodes or more general computer-readable codes on the containers 22. The sensor 34 also may be and/or may comprise a camera, a laser scanner and/or any device adapted for determining positions and/or orientations of containers 22. The sensor 34 also may comprise an RFID reader.

The camera 14 may be a stereo camera for generating stereo video data or may be a TOF camera for generating pixel wise depth information. The field of view of the camera 14 is directed to a work area 36 of a laboratory assistant, which work area will be described in more detail with respect to FIG. 2.

The camera 14 may be a stationary camera or may be mounted to a head of the laboratory assistant. In this case, the camera 14 may comprise a motion sensor 38, for example an acceleration sensor, which is adapted for determining a position and/or orientation of the camera 14 and/or of the head of the laboratory assistant. In such a way, a view position and/or view direction of the camera 14 may be determined.

The hand-held pipette 16 may be operated and moved by the laboratory assistant. The hand-held pipette 16 comprises a pipette tip 40, which may be used for aspirating and dispensing liquids from and into containers. Furthermore, the hand-held pipette may comprise a unit 42, which is adapted for determining, whether the laboratory assistant has actuated the hand-held pipette 16 to aspirate or dispense a liquid. The hand-held pipette 16 also may be adapted that several process parameters may be set, such as a dispensed and/or aspirated amount of liquid, a speed of aspirating and/or dispensing. Also these parameters may be acquired by the unit 42.

The hand-held pipette 16 may comprise a button 44, which may be pressed by the laboratory assistant. With the button 44, an aspiration and dispensing may be triggered.

FIG. 1 furthermore shows data that may be exchanged between the components 12, 14, 16, 18 during the operation of the system 10.

Configuration data 46 from the laboratory automation device 12 may be transmitted to the computing device 18. The configuration data 46 may encode a position, an orientation and/or a type of at least some of the containers 22 of the laboratory automation device 12. The configuration data also may encode, which type of liquids, such as samples, reagents, dilutions, etc. are in the containers 22. For example, this data may be acquired with the sensor 34. To this end, computer-readable codes may be printed on at least some of the containers 22.

The computing device 18 also receives video data 48 from the camera 14. The video data may display the movement of the hand-held pipette 16 and of further containers in the work area 36 of the laboratory assistant.

Furthermore, the computing device 18 may receive operational data 50 from the hand-held pipette 16, and in particular the unit 42 of the pipette 16, which may comprise a wireless sender/receiver. The operational data 50 may comprise the information acquired by the unit 42, such as an activation of an aspiration and/or dispensing and process parameters adjustable with the pipette 16, for example as mentioned above.

As will also described below in more detail, at least when the laboratory assistant has finished an assay protocol, which he or she has performed in the work area, the computing device 18 may generate a control program 52 for the laboratory automation device 12, which performs the analog assay protocol with the laboratory automation device 12.

In the end, the computing device 18 may execute the control program 52, which then generates control commands 54, which are transmitted to the laboratory automation device 12 and/or which control the pipetting arm 30 to perform the assay protocol defined by the laboratory assistant with the hand-held pipette 16.

Figure 2:
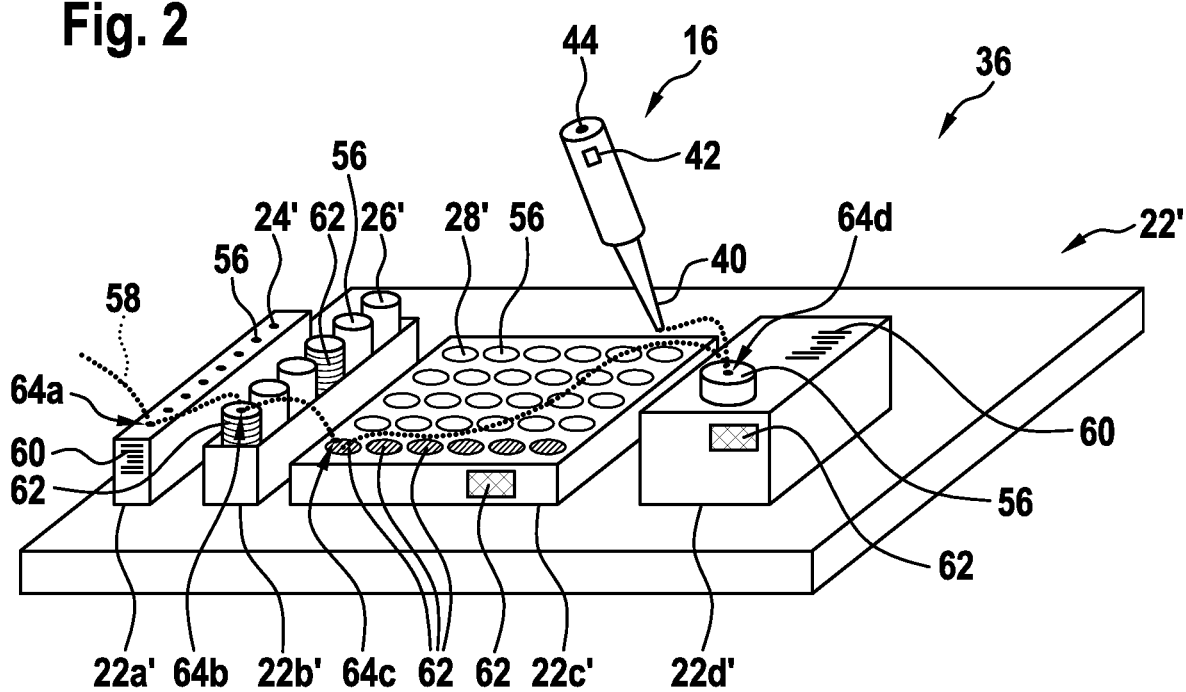
FIG. 2 schematically shows a work area for a laboratory assistant for the control system of FIG. 1.
Figure 3:
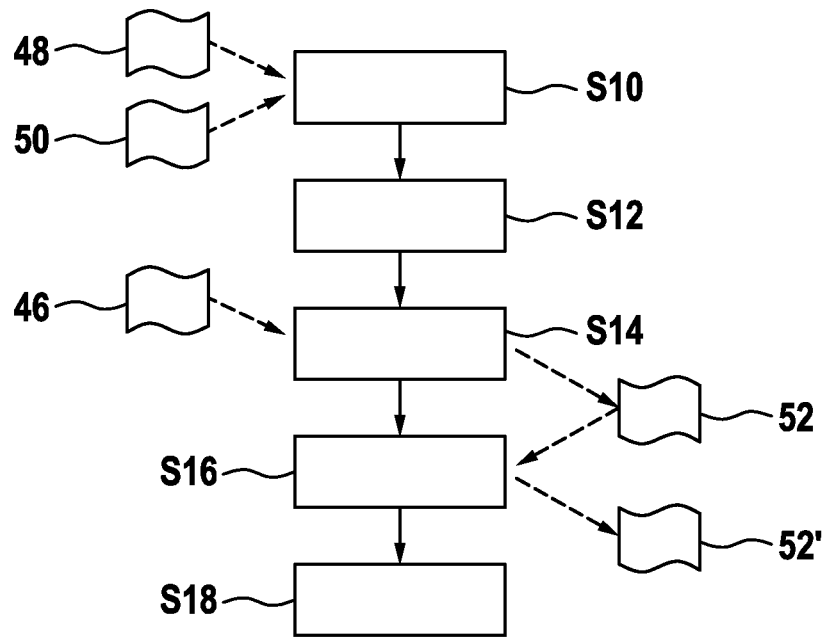
FIG. 3 shows a flow diagram for a method for generating a control program and for controlling a laboratory automation device according to an embodiment of the invention.

FIG. 2 shows the work area 36 in more detail. In the work area 36, containers 22' may be arranged, which may be similar and/or equal to the containers 22 in the laboratory automation device 12. It may be that the work area 36 is a part of the workbench 20 of the laboratory automation device 12 and that the container 22' and the containers 22 are the same. However, it is also possible that the work area 36 is at a different place as the laboratory automation device 12.

As the containers 22, the containers 22' of the work area 36 may comprise a container 22a' with disposable pipette tips 24', a container 22b' with sample tubes 26', a microtiter plate 22c' with wells 28' and a reagent container 22d'.

The containers 22, which are adapted for receiving liquids and disposable pipette tips 24', all have an opening 56, which may be detected in the video data 48.

It may be that a computer-readable code 60 is provided on some or all of the containers 22'. The code 60 may be read from the video data 48 and the information encoded into the code 60 may be determined. This information may include a type of container (such as a reagent container or sample container), a type of liquid in the container, etc. Alternatively or additionally, an RFID tag may be provided on some or all of the containers 22'. The code 60 also may be read with an RFID reader from the container 22'.

It also may be that some or all of the containers 22' are provided with a label 62. The label may be a specific pattern and/or color that also is identifiable by the laboratory assistant. For example, the border or an inside of the container 22' may be colored in a color for providing the label 62, such as shown for the wells 28'. The label 62 may be detected in the video data 48 and may be associated with the container 22'. The information of the label 62, such as a pattern code, a color code, a type of liquid, etc. may be determined from the video data 48.

FIG. 2 also shows a track 58 of the hand-held pipette 16 in the work area 36 and tracking points 64a, 64b, 64c, 64d on the track 58, which, for example, may be recorded, when the laboratory assistant presses the button 44 and are therefore determinable from the operational data 50. It also may be that the tracking points 64a, 64b, 64c, 64d are recorded, when it is determined from the video data 48 that the pipette tip 40 has entered an opening 56 of a container 22'.

FIG. 4 shows a flow diagram for a method for generating a control program 52 for a laboratory automation device 12 and optionally for controlling the laboratory automation device 12 by executing the control program 52.

In the beginning, the laboratory assistant may arrange the container 22' in the work area 36, may put on the camera 14, when it is a head-mounted camera 14 and may command the computing device 18 to start recording.

In step S10, the video data 48 displaying the work area 36 of the laboratory assistant is received in the computing device 18. Optionally, the operational data 50 from the hand-held pipette 16 is received in the computing device 18.

In step S12, the video data 48 and optionally the operational data 50 are evaluated by the computing device 18.

The computing device 18 may detect the containers 22', openings 56 of the containers 22' in the video data 48 and may determine positions of the containers 22' and the openings 56. Also, the computer-readable codes 60 and the labels 62 may be detected.

The containers 22', the openings 56, the pipette tip 40, the codes 60 and/or the labels 62 may be detected with an object recognition algorithm. Shapes and/or patterns of the components 22', 56, 40, 60, 62 may be stored in the computing device 18 and compared with shapes determined from the video data 48. Furthermore, specific types of containers 22' may be determined in such a way, such as microtiter plates 22c' or pipette tip containers 22a'.

The codes 60 and/or labels 62 detected in the video data 48 may be evaluated to retrieve their information content. Computer-readable codes 60 may be converted into their data content. Patterns and/or colors of labels 62 may be converted into pattern codes and color codes.

The computing device 18 furthermore may determine a movement and/or track 58 of the pipette tip 40 with respect to the containers 22', either the containers 22' are standing on a table, a workbench, etc. or are hold by the laboratory assistant. If the camera 14 is a head-mounted camera 14, also the containers 22' and/or openings 56 may be tracked, such that a relative position of the pipette tip 40 with respect to the container 22' and/or openings 56 may be determined. The components 22', 56, 40 may be tracked with an object tracking algorithm.

The computing device 18 furthermore may determine tracking points 64a, 64b, 64c, 64d on the track 58. Whenever a specific event takes place, such as mounting or disposing of a disposable tip 24' (tracking point 64a, see FIG. 2), aspiration of a liquid 62, 64 (tracking points 64b, 64d), dispensing of a liquid 62, 64 (tracking points 64c), such a tracking point may be recorded. The tracking point 64a may be a mounting point, the tracking points 64b, 64d may be aspiration points and the tracking point 64c may be a dispensing point.

In general, an event may take place, when the content and/or the configuration of the hand-held pipette 16 changes. Such events may be determined from the video data 48. For example, the pipette tip 40 changes in shape, when a disposable tip 24' is mounted. It also may be determined that a liquid has been aspirated, when the pipette tip 40 has been lowered into an opening 56. As a further example, whenever the laboratory assistant presses the button 44, which may be read from the operational data 50, it may be assumed that the liquid has been aspirated or dispensed. In general, a tracking point 64a, 64b, 64c, 64d may be encoded based on the operational data 50.

A tracking point 64a, 64b, 64c, 64d may encode the position of the event and/or the type of the event. The position may be encoded as three-dimensional coordinate and/or as the container 22' or type of container 22', where the event takes place.

When the laboratory assistant has finished the assay procedure, he may command the computing device 18 (or the respective computer program running in the computing device 18) to generate the control program 52.

In step S14, the control program 52 for the laboratory automation device 12 is then generated from the movement of the pipette tip 40 with respect to the positions of the openings 56 and the other information determined during step S12.

In general, the control program 52 is generated such that it is adapted for moving the pipetting arm 30 with a pipette 32 of the laboratory automation device 12 with respect to the containers 22 accordingly to the assay protocol defined by the laboratory assistant in the work area 36. This may include moving the robot pipette 32 of the pipetting arm 30 accordingly to the hand-held pipette 16, controlling the robot pipette 32 for aspirating and dispensing of a liquid accordingly to the hand-held pipette 16 and/or for mounting and disposing of disposable tips 24 accordingly to the hand-held pipette 16.

In one example, the containers 22' in the work area 36 are arranged as the containers 22 in the laboratory automaton device (or these containers 22, 22' are the same). Then, the control program 52 may be generated, such that only the aspiration and dispensing of the hand-held pipette 16, optionally a mounting and disposing of disposable tips 24, and the movement to the respective positions is repeated by the pipetting arm 30 with the robot pipette 32. It is not necessary that the control program 52 knows the content and/or liquids within the respective containers 22, 22'.

In another example, the laboratory assistant performs an assay protocol for one sample 26', i.e. the video data 48 is recorded for one sample 26' and the control program 52 is generated, such that it repeats the movement of the pipette 32 arm and/or aspiration and dispensing of the robot pipette 32 for a plurality of samples 26 in the laboratory automation device 12. For example, this may be achieved by simply moving the positions, where a aspiration and dispensing of the pipette 32 and optionally a mounting and disposing of a disposable tip takes place to the next neighbouring position at a corresponding container 22. Also, a multi-channel robot pipette 32 may be operated along columns of a microtiter plate.

In a further example, the movement of the pipetting arm 30 and the pipette 32, an aspiration and dispensing of pipette 32 and/or optionally a mounting and disposing of disposable tips 24 is determined from the tracking points 64a, 64b, 64c, 64d. From the events associated with the tracking points, corresponding commands for the control program 52 may be derived. For example, the tracking point 64a may be converted into the command "mount removable tip" and the tracking point 64a may be converted into "aspire sample", etc. Also in this case, the control program 52 may be generated, such that it repeats the task for several samples.

In a further example, the control program 52 may be generated for containers 22 of the laboratory automation device 12 of the same type as identified for the containers 22' in the work area 36. In the case, the tracking points 64a, 64b, 64c, 64d may be used for identifying from which type of container 22 a liquid may have to be aspirated and in which type of container may have to be dispensed. In this case, the containers 22' may be arranged in a different way as the containers 22.

To determine the types of containers 22, which may be matched with the container 22, the computing device 18 requests the configuration data 46 from the laboratory automation device 12. For example, a laser scanner and/or camera may determine the types, the positions and/or orientations of the containers 22. Furthermore, a bar code scanner may scan bar codes on the containers 22 and/or an RFID scanner may be used to determine their type and/or contents. The configuration data 46 may comprise information on a position and a type of the containers 22. The configuration data 46 may be used for generating the control program 52.

In step S16, the control program 52 optionally may be modified into a control program 52'. For example, the generated control program 52 may be a script, which may be modified further by the laboratory assistant. For example, a repeating control structure may be inserted by the laboratory assistant into the control program 52. It also may be that additional steps, like the incubation of a sample, are included into the control program 52.

It also may be that the control program 52 contains commands, which are based on the pattern codes and/or color codes, such as "red well", "pink container", etc., which may be replaced by the laboratory assistant with real containers 22' or types of containers 22' of the laboratory automation device 12.

In step S18, the control program 52 or 52' is executed by the computing device 18, for example, when the laboratory assistant commands a computer program in the computing device 18 to execute the control program 52, 52'. This may be done several times. For example, when the control program 52, 52' has finished, the laboratory assistant may arrange new containers 22 in the laboratory automation device 12, for example in the same layout, and may start the control program 52, 52' again.

When the control program 52, 52' is executed, control commands 54 are generated and the laboratory automation device 12 performs the assay protocol, which has been designed by the laboratory assistant in the work area 36. In particular, the same assay protocol performed for one sample 26' in the work area 36 may be performed a plurality of times with the laboratory automation device 12 for a plurality of samples 26.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method for generating a control program for a laboratory automation device, the method comprising:

receiving video data displaying a work area of a laboratory assistant, the work area containing a hand-held pipette and containers for receiving a liquid;

detecting openings of the containers in the video data and determining positions of the openings;

detecting a pipette tip of the hand-held pipette in the video data and determining a movement of the tip;

generating the control program for the laboratory automation device from the movement of the pipette tip with respect to the positions of the openings, wherein the control program is adapted for moving a pipetting arm with a robot pipette of the laboratory automation device with respect to containers of the laboratory automation device accordingly to the movement of the hand-held pipette in the work area.

2. The method of claim 1,
wherein the openings and the pipette tip are detected with an object recognition algorithm.

3. The method of claim 1,
wherein the movement of the pipette tip is tracked with an object tracking algorithm.

4. The method of claim 1, further comprising:
identifying a type of container for each container from the video data and/or from a RFID tag attached to the container;
wherein the control program is generated for containers of the laboratory automation device of the same type as identified for the containers in the work area.

5. The method of claim 4,
wherein the containers in the work area are provided with a computer-readable code and the type of container is determined from the computer-readable code in the video data.

6. The method of claim 4,
wherein the containers in the work area are provided with a label and information from the label for a container is determined from the video data;
wherein the type of container is determined from the information;
wherein the label is a colored label and the information is a color.

7. The method of claim 4,
wherein the type of container is determined from a shape of the container, which is determined from the video data.

8. The method of claim 1, further comprising:
receiving operational data from the hand-held pipette, the operational data comprising at least one of: activation of aspirating and/or dispensing of a liquid, a dispensed and/or aspirated amount of liquid, a speed of aspirating and/or dispensing;
wherein the control program is adapted for controlling the robot pipette for aspirating and dispensing of a liquid accordingly to the operational data.

9. The method of claim 1,
wherein aspiration points and dispensing points for liquids are determined from the movement of the pipette tip with respect to the openings;
wherein a movement of the pipetting arm is determined from the aspiration points and dispensing points.

10. The method of claim 1,
wherein movement of the pipette tip and/or operational data for the hand-held pipette is recorded for one sample;
wherein the control program is generated, such that it repeats the movement of the pipetting arm and/or aspiration and dispensing of the robot pipette for a plurality of samples in the laboratory automation device.

11. The method of claim 1,
wherein the video data comprises depth information and is generated with a camera adapted for generating depth information.

12. The method of claim 1,
wherein the video data is generated with a camera attached to a head of the laboratory assistant.

13. A non-transitory computer-readable medium storing instructions for generating a control program for a laboratory automation device, which, when being executed by a processor, is adapted to carry out the steps of the method of claim 1.

14. A control system for a laboratory automation device, the system comprising:
the laboratory automation device;
a camera;
a computing device communicatively interconnected with the laboratory automation device and the camera and adapted for performing the method according to claim 1.

* * * * *